US012614516B2

(12) United States Patent
Tao et al.

(10) Patent No.: US 12,614,516 B2
(45) Date of Patent: Apr. 28, 2026

(54) DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventors: Baosheng Tao, Wuhan (CN); Chao Liu, Wuhan (CN); Hao Wu, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/852,862

(22) PCT Filed: Jun. 29, 2023

(86) PCT No.: PCT/CN2023/103980

§ 371 (c)(1),
(2) Date: Sep. 30, 2024

(87) PCT Pub. No.: WO2024/082703

PCT Pub. Date: Apr. 25, 2024

(65) Prior Publication Data

US 2025/0218362 A1 Jul. 3, 2025

(30) Foreign Application Priority Data

Oct. 19, 2022 (CN) ......................... 202211280723.2

(51) Int. Cl.
*G09G 3/3233* (2016.01)

(52) U.S. Cl.
CPC ... *G09G 3/3233* (2013.01); *G09G 2300/0842* (2013.01); *G09G 2300/0861* (2013.01);
(Continued)

(58) Field of Classification Search
None
See application file for complete search history.

(56) References Cited

U.S. PATENT DOCUMENTS

2017/0004766 A1 * 1/2017 Cho ...................... G06F 1/1652
2018/0218678 A1 * 8/2018 Kwon .................. G09G 3/3233
(Continued)

FOREIGN PATENT DOCUMENTS

CN 111968574 A * 11/2020 ........... G09G 3/3208
CN 112086062 A 12/2020
(Continued)

OTHER PUBLICATIONS

International Search Report in International application No. PCT/CN2023/103980, mailed on Sep. 8, 2023.
Written Opinion of the International Search Authority in International application No. PCT/CN2023/103980, mailed on Sep. 8, 2023.
(Continued)

*Primary Examiner* — Dorothy Harris
(74) *Attorney, Agent, or Firm* — PV IP PC; Peter Stecher; Wei Te Chung

(57) ABSTRACT

The present application provides a display device, which includes a display panel, a gate driver, and an emission driver. In a first duration corresponding to a writing frame and each holding frame, a ratio of number of periods of a light-emitting control signal to a first duration is greater than a critical flicker frequency. A valid pulse of the first scan signal corresponds to an invalid pulse of the light-emitting control signal, and a valid pulse of the second scan signal is located within a duration of the invalid pulse in the first period of the light-emitting control signal corresponding to the writing frame.

11 Claims, 6 Drawing Sheets

(52) U.S. Cl.
CPC . *G09G 2310/08* (2013.01); *G09G 2320/0247* (2013.01); *G09G 2330/021* (2013.01)

(56) References Cited

U.S. PATENT DOCUMENTS

| | | | | | |
|---|---|---|---|---|---|
| 2018/0315374 | A1* | 11/2018 | Zhang | G09G 3/3208 |
| 2019/0122612 | A1* | 4/2019 | Jeon | G09G 3/3225 |
| 2020/0082768 | A1* | 3/2020 | Oh | G09G 3/3291 |
| 2020/0394961 | A1* | 12/2020 | Kim | G09G 3/3266 |
| 2021/0125559 | A1* | 4/2021 | Park | H10K 59/1213 |
| 2021/0264857 | A1* | 8/2021 | Wang | G09G 3/3258 |
| 2022/0366830 | A1* | 11/2022 | Zhang | G09G 3/2092 |
| 2024/0021142 | A1* | 1/2024 | Tian | G09G 3/3233 |
| 2024/0078972 | A1* | 3/2024 | Zhang | G09G 3/3233 |

FOREIGN PATENT DOCUMENTS

| | | | | | |
|---|---|---|---|---|---|
| CN | 113906495 | A | * | 1/2022 | G09G 3/3258 |
| CN | 114038383 | A | | 2/2022 | |
| CN | 114078445 | A | * | 2/2022 | G09G 3/3233 |
| CN | 115662328 | A | | 1/2023 | |
| KR | 20170003849 | A | | 1/2017 | |
| KR | 20210107934 | A | | 9/2021 | |
| KR | 102453259 | B1 | * | 10/2022 | G09G 3/3233 |

OTHER PUBLICATIONS

Chinese Office Action issued in corresponding Chinese Patent Application No. 202510137957.9 dated Feb. 24, 2026, pp. 1-10.
Korean Office Action issued in corresponding Korean Patent Application No. 10-2025-7016419 dated Dec. 11, 2025, pp. 1-6.

* cited by examiner

DISPLAY DEVICE

CROSS-REFERENCE TO RELATED APPLICATIONS

This application is a National Stage of International Application No. PCT/CN2023/103980, filed on Jun. 29, 2023, which claims priority to Chinese Patent Application No. 202211280723.2, filed on Oct. 19, 2022, the content of which are incorporated herein by reference in their entireties.

TECHNICAL FIELD

This application relates to display technology, particularly to a display device.

BACKGROUND

With continuous updates and iterations of display devices such as smartphones and smartwatches, users have increasingly higher requirements for display performance and endurance performance of display devices. However, in practical use, an enabled high display performance of a display device tends to increase its power consumption, thereby reducing its endurance. To improve endurance, display performance often has to be compromised. As a result, display devices cannot satisfy both the display performance requirements and the endurance performance requirements.

SUMMARY

The embodiments of this application provide a display device that can balance display performance requirements with endurance performance requirements.

The embodiments of this application provide a display device, including a display panel, a gate driver, and an emission driver. The display panel includes multiple sub-pixels; the gate driver includes a first gate driving unit and a second gate driving unit, the first gate driving unit is configured to output a first scan signal to the sub-pixels, the second gate driving unit is configured to output a second scan signal to the sub-pixels; the emission driver is configured to output a light-emitting control signal to the sub-pixels.

Wherein the display panel has multiple display periods, at least one of the display periods includes a writing frame and multiple holding frames, the writing frame and each of the multiple holding frames both have a first duration; within the writing frame and each of the multiple holding frames, the light-emitting control signal has multiple periods, a ratio of number of the periods of the light-emitting control signal to the first duration is greater than a critical flicker frequency.

The light-emitting control signal has a valid pulse and an invalid pulse in each period, the first scan signal has a valid pulse during a duration of the invalid pulse of the light-emitting control signal in the writing frame and the multiple holding frames, the second scan signal has a valid pulse during a duration of the invalid pulse duration in the first period of the light-emitting control signal in the writing frame.

Beneficial Effects

This application provides a display device that includes a display panel, a gate driver, and an emission driver. The gate driver includes a first gate driving unit and a second gate driving unit that output the first scan signal and the second scan signal to the sub-pixels of the display panel, and the emission driver outputs the light-emitting control signal to the sub-pixels. The display panel includes multiple display periods, with at least one display period having a writing frame and multiple holding frames. By making the ratio of the number of periods of the light-emitting control signal to the first duration greater than the critical flicker frequency within the first duration of the writing frame and each holding frame, it is possible to have the sub-pixels switched between display states and non-display states under the control of the light-emitting control signal, thereby reducing the viewer's perception of flickers of the display panel, resulting in better display performance. By making the valid pulse of the first scan signal correspond one-to-one with the invalid pulse of the light-emitting control signal, and making the valid pulse of the second scan signal only present during the duration of the invalid pulse in the first period of the light-emitting control signal in the writing frame, it is possible to have the sub-pixels switched between display states and non-display states many times in the writing frame and the multiple holding frames according to the same display content under the control of the light-emitting control signal, the first scan signal, and the second scan signal within the total duration of one display period. This results in multiple sub-pixels displaying the same information within the total duration corresponding to the writing frame and multiple holding frames, thereby achieving the purpose of satisfying requirements on both the display performance and the endurance performance.

DETAILED DESCRIPTION

It should be understood that the embodiments described herein are only for the purpose of explaining the present application and do not limit the present application.

Figure 1:
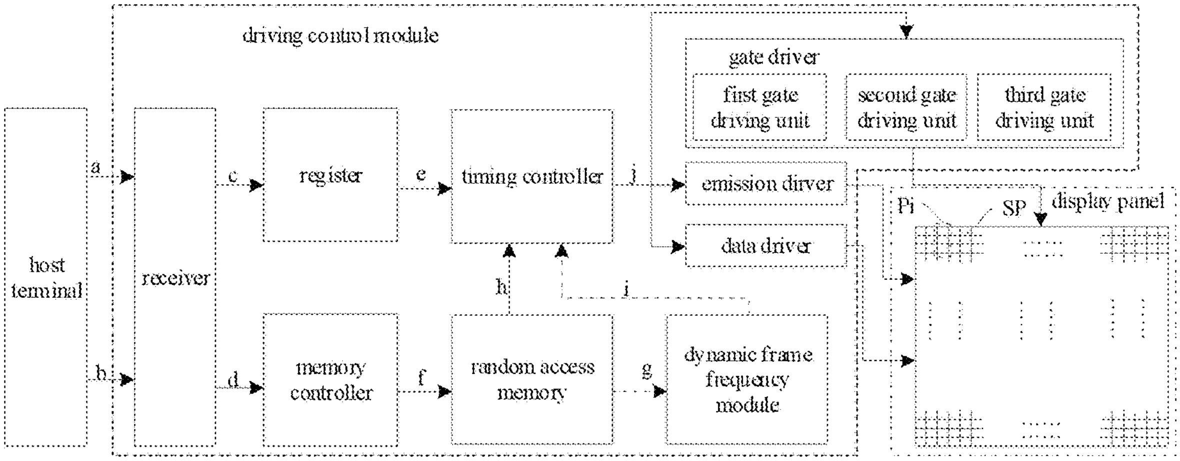
FIG. 1 is a structural schematic diagram of the display device provided in one or more embodiments of this application.

Specifically, FIG. 1 is the structural schematic diagram of the display device provided in one or more embodiments of this application. The display device includes the display panel and the driving control module.

Optionally, the display panel includes an self-emitting display panel. Optionally, the self-emitting display panel includes an organic light-emitting diode display panel, an sub-millimeter light-emitting diode display panel, an micro light-emitting diode display panel, a quantum dot display panel, etc.

The display panel includes multiple sub-pixels SP, multiple scan lines, multiple data lines, and multiple light-emitting control lines. The multiple sub-pixels SP form multiple pixel units Pi arranged in an array. The multiple scan lines, the multiple data lines, and the multiple light-emitting control lines are electrically connected to the multiple sub-pixels SP to enable the multiple sub-pixels SP to achieve display functions according to corresponding scan signals, data signals Data, and light-emitting control signals EM.

Optionally, each pixel unit Pi includes three sub-pixels SP. Optionally, the three sub-pixels SP included in each pixel unit Pi have different colors of light emission. Wherein, the colors of light emission of the sub-pixels SP include red, green, blue, yellow, white, etc.

Optionally, the driving control module includes a gate driver, an emission driver, and a data driver.

The gate driver is configured to output scan signals to the display panel. Optionally, the gate driver is electrically connected to multiple scan lines to transmit scan signals to multiple sub-pixels SP through multiple scan lines.

Optionally, the gate driver includes a first gate driving unit and a second gate driving unit. The first gate driving unit is configured to output the first scan signals Pscan1 to the display panel. The second gate driving unit is configured to output the second scan signals Pscan2 to the display panel.

The emission driver is configured to output the light-emitting control signals EM to the display panel. Optionally, the emission driver is electrically connected to multiple light-emitting control lines to output the light-emitting control signals EM to multiple sub-pixels SP through multiple light-emitting control lines.

The data driver is configured to output the data signals Data to the display panel. Optionally, the data driver is electrically connected to multiple data lines to output the data signals Data to multiple sub-pixels SP through multiple data lines.

Optionally, the driving controller includes a receiver, a register, a timing controller, a memory controller, a random access memory and a dynamic frame frequency module. The principle of the driving controller controlling the gate driver, the data driver, and the emission driver to achieve control of the display states of multiple pixel units Pi is as follows.

First stage: the receiver outputs an instruction c to the register according to the register instruction a input from the host, and the register is configured according to the instruction c.

Second stage: the host inputs an image data signal b to the receiver at certain time intervals (for example, the time intervals of one minute), and the receiver outputs an image data signal d to the memory controller according to the image data signal b input from the host, and the memory controller outputs an image data signal f to the random access memory according to the image data signal d.

Third stage: the register outputs an instruction e for the corresponding timing control setting to the timing controller, and the random access memory outputs an image data signal h to the timing controller according to the image data signal f, and the dynamic frame frequency module outputs the high-frequency switch instruction i to the timing controller after detecting that the random access memory has updated data signal g.

Fourth stage: the timing controller outputs the corresponding high-frequency switch instruction j to the gate driver, the emission driver, and the data driver, to control the display panel to achieve display with the high-frequency driving mode through the gate driver, the emission driver, and the data driver, causing multiple sub-pixels SP to display.

Fifth stage: the host stops outputting image data signals to the receiver, and the dynamic frame frequency module outputs the low-frequency switch instruction i to the timing controller after detecting that the random access memory has no updated data signal g.

Sixth stage: the timing controller outputs the corresponding low-frequency switch instruction j to the gate driver, the emission driver, and the data driver, to control the display panel to achieve display with an ultra-low-frequency driving mode through the gate driver, the emission driver, and the data driver, causing multiple sub-pixels SP to display.

To achieve display functions, the display panel can have multiple display periods. To achieve frequency conversion technology, the duration corresponding to each display period of the display panel can be different. When the display panel displays with the high-frequency driving mode, the display period can include only one writing frame WF. When the display panel displays with the frequency lower than the high-frequency driving mode, the display panel can include one writing frame WF and at least one holding frame HF. The data signal Data is written into the sub-pixel SP during the duration of the valid pulse of the second scan signal Pscan2 written in the writing frame WF, and the data signal Data written into the sub-pixel SP during the writing frame WF is maintained in the holding frame HF, so that the display panel displays the same information within the total duration tsu of one display period when the display panel displays with the frequency lower than the high-frequency driving mode.

The lower the frequency at which the display panel displays, the more it is conducive to improving the endurance performance of the display device. In particular, to improve the endurance performance of the display device, the display panel can display with an ultra-low frequency. The ultra-low frequency refers to the frequency less than 1 Hz. However, when the display panel displays with the ultra-low frequency, it will cause the more serious flicker problem.

To enable the display panel to apply the ultra-low frequency to achieve display while ameliorating the flicker problem, to achieve the purpose of balancing display performance and endurance performance, this application makes each of the writing frame WF and multiple holding frames HF have the first duration tfr, and the ratio of the number of periods Noft of the light-emitting control signal EM to the first duration tfr within each of the writing frame WF and multiple holding frames HF is greater than the critical flicker frequency CFF, that is, Ncft/tfr>CFF, so that the sub-pixels SP achieve multiple switches between display states and non-display states under the control of the light-emitting control signal EM, respectively, within the writing frame WF and multiple holding frames HF, thereby reducing the viewer's perception of flickers of the display panel within the total duration tsu corresponding to the writing frame WF and multiple holding frames HF, resulting in better display performance of the display panel.

By making the light-emitting control signal EM have the valid pulse and an invalid pulse in each period, the first scan signal Pscan1 may have the valid pulse during the duration of each invalid pulse of the light-emitting control signal EM written in the writing frame WF and multiple holding frames HF, and the second scan signal Pscan2 may have the valid pulse during the duration of the invalid pulse of the first period of the light-emitting control signal EM in the writing frame WF, so that within the total duration tsu corresponding to one display period, the sub-pixels SP achieve multiple switches between display states and non-display states according to the same display content under the control of the light-emitting control signal EM, the first scan signal Pscan1, and the second scan signal Pscan2, respectively, within the writing frame WF and multiple holding frames HF, thereby making the information displayed by multiple sub-pixels SP the same within the total duration tsu corresponding to the writing frame WF and multiple holding frames HF, to achieve the purpose of balancing display performance and endurance performance.

Wherein, the critical flicker frequency CFF is the minimum frequency of the flickering light that the human eye can perceive as stable light. Optionally, the critical flicker frequency CFF is greater than or equal to 45 Hz.

Figure 2:
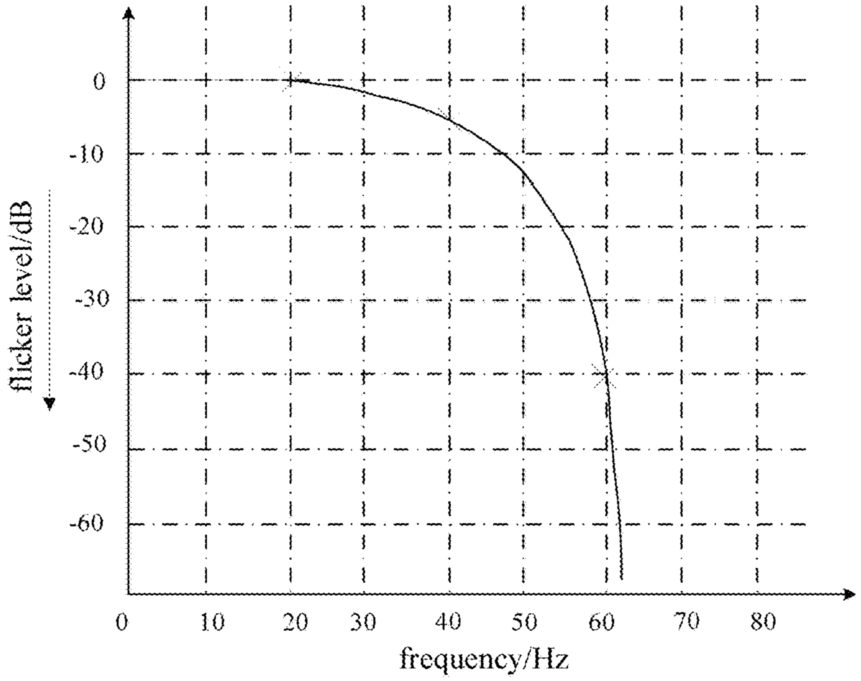
FIG. 2 is a human eye perception diagram of flickers provided in one or more embodiments of this application.

As shown in FIG. 2, which is the human eye perception diagram of flickers provided in the embodiment of this application, since the critical flicker frequency CFF is closely related to display brightness, ambient brightness, viewing distance, and many other factors and is not the constant, and according to FIG. 2, it can be known that when the frequency is greater than or equal to 60 Hz, the human eye can no longer perceive the flicker. Therefore, the ratio of the number of periods Noft of the light-emitting control signal EM to the first duration tfr can be greater than or equal to 60 Hz in each of the writing frame WF and multiple holding frames HF, that is, Ncft/tfr>60 Hz, to ensure that the human eye may not perceive any flicker occurring in the display screen during actual use.

It can be understood that the total duration tsu of one display period is the sum of the multiple first durations tfr corresponding to the writing frame WF and multiple holding frames HF included in one display period. That is, sut=m*tfr. Where m is the total number of frames, and the total number of frames m is the sum of the numbers of the writing frame WF and of the multiple holding frames HF included in one display period.

Optionally, to enable the display panel to achieve display with the ultra-low frequency, the total number of frames m included in one display period needs to be less than or equal to the skip frame limit SKL provided by the driving control module, that is, m≤SKL. Correspondingly, the ratio of the total duration tsu of one display period to the first duration tfr is less than or equal to the skip frame limit SKL provided by the driving control module, that is, tsu/tfr≤SKL. Optionally, the skip frame limit SKL provided by the driving control module is determined by the number of bits of the register included in the driving control module that controls the number of skip frames. Specifically, if the register that controls the number of skip frames is x-bit, then the skip frame limit equals 2^x. For example, if the register that controls the number of skip frames is 8 bits, then the skip frame limit SKL equals 2^8=256; if the register that controls the number of skip frames is 10 bits, then the skip frame limit SKL equals 2^10=1024. Wherein, the register shown in FIG. 1 represents all the registers included in the display device, and is not only used to represent the register that controls the number of skip frames.

Optionally, since the data signal Data is written into the sub-pixel SP during the duration of the valid pulse of the second scan signal Pscan2 in the writing frame WF, and the display panel displays the same information within the total duration tsu of one display period, the target frequency f1 of the second scan signal Pscan2 within the total duration tsu of one display period (that is, the sum of the multiple first durations corresponding to the writing frame WF and multiple holding frames HF) can be less than 1 Hz, that is, f1<1 Hz. Thereby it is possible for the sub-pixel SP to update the display information according to each display period, thereby achieving ultra-low frequency display of the display panel. Correspondingly, the total duration tsu of one display period is the reciprocal of the target frequency f1 of the second scan signal Pscan2 within one display period, that is, tsu=1/f1.

Optionally, the target frequency f1 is the frequency used when the display panel displays with an ultra-low frequency driving mode. That is, the target frequency f1 can be equal to 0.99 Hz, 0.98 Hz, . . . , 0.9 Hz, 0.89 Hz, . . . , 0.75 Hz, . . . , 0.5 Hz, . . . , 0.11 Hz, 0.1 Hz, 0.099 Hz, 0.098 Hz, . . . , 0.09 Hz, 0.089 Hz, . . . , 0.08 Hz, 0.079 Hz, . . . , 0.07 Hz, 0.069 Hz, . . . , 0.064 Hz, . . . , 0.06 Hz, . . . , 0.05 Hz, . . . , 0.04 Hz, . . . , 0.032 Hz, . . . , 0.03 Hz, . . . , 0.02 Hz, . . . , 0.016 Hz, 0.015 Hz, . . . , 0.01 Hz, 0.009 Hz, 0.008 Hz, . . . , 0.006 Hz, 0.005 Hz, 0.004 Hz, . . . , and so on.

Optionally, within the writing frame WF, a product of the base frequency f3 of the second scan signal Pscan2 and the number of periods Noft of the light-emitting control signal EM is equal to the intermediate frequency f2 of the light-emitting control signal EM, to meet the requirements of the number of periods Noft of the light-emitting control signal EM within each of the writing frame WF and multiple holding frames HF, so that the display screen of the display panel meets the display performance requirements.

Since the data signal Data is written into the sub-pixel SP during the duration of the valid pulse of the second scan signal Pscan2 in the writing frame WF, and the display panel displays the same information within the total duration tsu of one display period, the first duration tfr of the writing frame WF and each holding frame HF corresponds to the reciprocal of the base frequency f3 of the second scan signal Pscan2, that is, tfr=1/f3, to make the sub-pixel SP display the same information within one display period, thereby achieving ultra-low frequency display of the display panel.

Optionally, the frame total number m can be obtained based on the base frequency f3 and the target frequency f1, that is, the ratio of the base frequency f3 to the target frequency f1 is equal to the total number of frames m (that is, the ratio of the base frequency f3 to the target frequency f1 is equal to the sum of the numbers of writing frames WF and multiple holding frames HF), that is, f3/f1=m.

Figure 3:
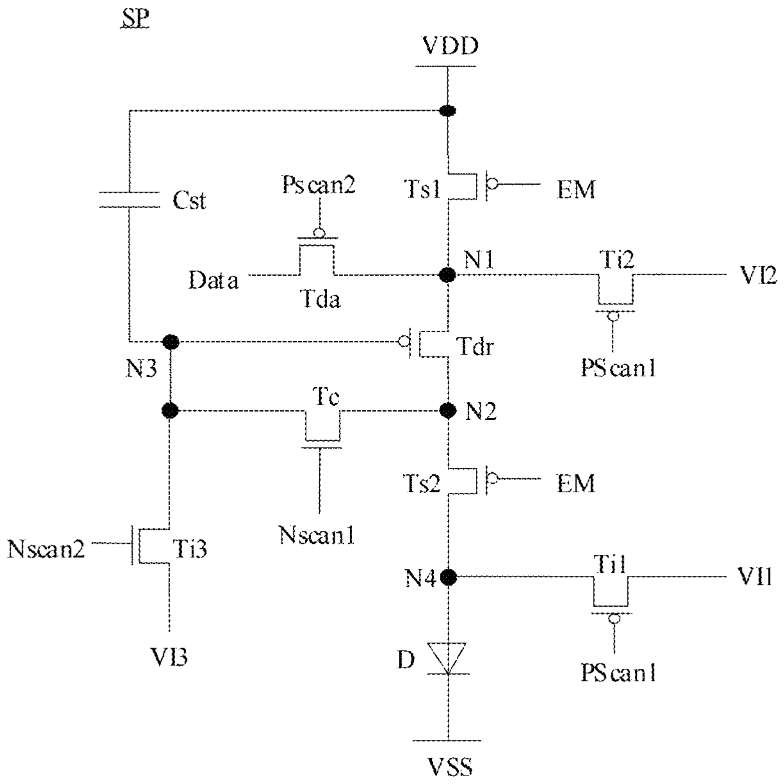
FIG. 3 is a structural schematic diagram of the sub-pixel provided in one or more embodiments of this application.

The following will explain the working principle corresponding to the high-frequency driving mode and the low-frequency driving mode when the display panel displays, combined with the specific form of the sub-pixel SP. Optionally, FIG. 3 is the structural schematic diagram of the sub-pixel provided in one or more embodiments of this application. It can be understood that the structure of the sub-pixel SP is not limited to the form shown in FIG. 3.

Each sub-pixel SP includes a driving transistor Tdr, the first reset transistor Ti1, the second reset transistor Ti2, the data transistor Tda, the light-emitting control transistor, and the light-emitting device D.

The driving transistor Tdr is configured to generate the driving current according to the data signal Data to drive the light-emitting device D to emit light. Optionally, the driving transistor Tdr includes an input electrode connected to the first node N1, an output electrode connected to the second node N2, and a control electrode connected to the third node N3. Wherein, the control electrode is the gate, the input electrode is one of the source and the drain, and the output electrode is the other of the source and the drain.

The first reset transistor Ti1 is configured to reset the anode voltage of the light-emitting device D according to the first scan signal Pscan1. Optionally, the first reset transistor Ti1 includes a control electrode configured to receive the first scan signal Pscan1, an input electrode configured to receive the first reset signal VI1, and an output electrode connected to the fourth node N4.

The second reset transistor Ti2 is configured to reset the input electrode voltage and the output electrode voltage of the driving transistor Tdr according to the first scan signal Pscan1. Optionally, the second reset transistor Ti2 includes a control electrode configured to receive the first scan signal Pscan1, an input electrode configured to receive the second reset signal VI2, and an output electrode connected to the first node N1. The first reset transistor Ti1 and the second reset transistor Ti2 are turned on under the level state corresponding to the valid pulse of the first scan signal Pscan1, and are cut off under the level state corresponding to the invalid pulse of the first scan signal Pscan1.

The data transistor Tda is configured to transmit the data signal Data to the driving transistor Tdr through the first node N1 according to the second scan signal Pscan2. Optionally, the data transistor Tda includes a control electrode configured to receive the second scan signal Pscan2, an input electrode configured to receive the data signal Data, and an output electrode connected to the first node N1. The data transistor Tda is turned on under the level state corresponding to the valid pulse of the second scan signal Pscan2, and is cut off under the level state corresponding to the invalid pulse of the second scan signal Pscan2.

The light-emitting control transistor is configured to control the conduction path of the driving current according to the light-emitting control signal EM, allowing or cutting off the current flow. Optionally, the light-emitting control transistor includes a first switch transistor Ts1 and the second switch transistor Ts2. The first switch transistor Ts1 includes a control electrode configured to receive the light-emitting control signal EM, an input electrode connected to a first power terminal VDD, and an output electrode connected to the first node N1. The second switch transistor Ts2 includes a control electrode configured to receive the light-emitting control signal EM, an input electrode connected to the second node N2, and an output electrode connected to the fourth node N4. The first switch transistor Ts1 and the second switch transistor Ts2 are turned on under the level state corresponding to the valid pulse of the light-emitting control signal EM, and are cut off under the level state corresponding to the invalid pulse of the light-emitting control signal EM.

The light-emitting device D includes an anode connected to the fourth node N4 and the cathode configured to be connected to the second power terminal VSS. Optionally, the light-emitting device D includes an organic light-emitting diode, the sub-millimeter light-emitting diode, the micro light-emitting diode, etc.

Optionally, please continue to refer to FIG. 1 to FIG. 3, the gate driver also includes a third gate driving unit. The third gate driving unit is configured to output the third scan signal Nscan1 and the fourth scan signal Nscan2 to the sub-pixel SP.

Optionally, the third scan signal Nscan1 and the fourth scan signal Nscan2 both have one valid pulse during the duration of the invalid pulse in the first period of the light-emitting control signal EM in the writing frame WF, to initialize the potential of the third node N3 in the writing frame WF, and to transmit the data signal Data to the gate of the driving transistor Tdr in the writing frame WF, so that the sub-pixel SP maintains the display in the holding frame HF according to the data signal Data written into the sub-pixel SP within the writing frame WF.

The sub-pixel SP also includes a compensation transistor Tc, the third reset transistor Ti3, and the storage capacitor Cst.

The compensation transistor Tc includes a control electrode configured to receive the third scan signal Nscan1, an input electrode connected to the third node N3, and an output electrode connected to the second node N2.

The third reset transistor Ti3 includes a control electrode configured to receive the fourth scan signal Nscan2, an input electrode configured to receive the third reset signal VI3, and an output electrode connected to the third node N3.

The storage capacitor Cst includes a first electrode connected to the first power terminal VDD and a second electrode connected to the third node N3.

Optionally, the active layer of the compensation transistor Tc and the active layer of the third reset transistor Ti3 both include oxide semiconductors. The active layers of the driving transistor Tdr, the first reset transistor Ti1, the second reset transistor Ti2, the data transistor Tda, and the light-emitting control transistor all include silicon semiconductors. Optionally, silicon semiconductors include single crystal silicon, polycrystalline silicon, amorphous silicon, and other materials, and oxide semiconductors include at least one of zinc oxide, zinc tin oxide, zinc indium oxide, indium oxide, titanium oxide, indium gallium zinc oxide, indium zinc tin oxide, etc. Optionally, the driving transistor Tdr, the first reset transistor Ti1, the second reset transistor Ti2, the data transistor Tda, and the light-emitting control transistor are made by low-temperature polycrystalline silicon process.

To ameliorate the flicker problem, the first node N1, the second node N2, the third node N3, and the fourth node N4 of the sub-pixel SP are made to maintain equal potentials at durations corresponding to the multiple non-display states or display states of the sub-pixel SP within the writing frame WF and each holding frame HF.

Optionally, during the duration of multiple invalid pulses of the light-emitting control signal EM, the potential of the first node N1 remains equal, the potential of the second node N2 remains equal, the potential of the third node N3 remains equal, and the potential of the fourth node N4 remains equal, to ameliorate the flicker problem.

Optionally, the voltage value of the second reset signal VI2 can be controlled to achieve equal potentials of the first node N1 and the second node N2 during the duration of multiple invalid pulses of the light-emitting control signal EM. Optionally, the driving transistor Tdr is the P-type transistor. During duration of each valid pulse period of the first scan signal Pscan1, the potential difference between the third node N3 and the second reset signal VI2 is less than the threshold voltage of the driving transistor Tdr. This configuration ensures that when the second reset transistor Ti2 is turned on, the driving transistor Tdr is also turned on. Consequently, the second reset transistor Ti2 resets the input electrode potential (i.e., the potential of the first node N1)

and the output electrode potential (i.e., the potential of the second node N2) of the driving transistor Tdr according to the first scan signal Pscan1.

Figure 4:
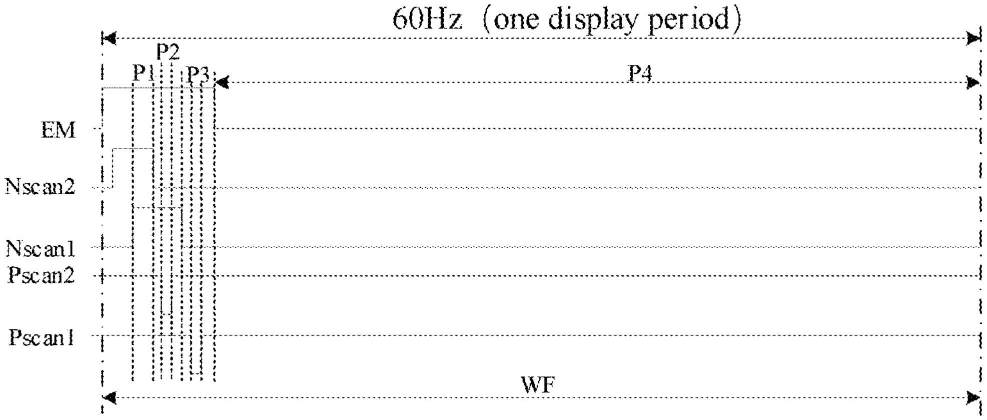
FIG. 4 is a timing diagram under the high-frequency driving mode provided in one or more embodiments of this application.

FIG. 4 is the timing diagram under the high-frequency driving mode provided in the embodiment of this application. Taking the case where the frequency corresponding to the high-frequency driving mode is 60 Hz, the driving transistor Tdr, the first reset transistor Ti1, the second reset transistor Ti2, the data transistor Tda, the first switch transistor Ts1, and the second switch transistor Ts2 are all P-type transistors, and the compensation transistor Tc and the third reset transistor Ti3 are all N-type transistors as an example, the working principle of the sub-pixel SP shown in FIG. 3 is explained. One display period includes only the writing frame WF, and the writing frame WF includes an initialization stage P1, a data writing stage P2, a node reset stage P3, and a light-emitting stage P4.

Initialization stage P1: the light-emitting control signal EM, the first scan signal Pscan1, the second scan signal Pscan2, the third scan signal Nscan1, and the fourth scan signal Nscan2 all correspond to the high-level state. The third reset transistor Ti3 is turned on in response to the fourth scan signal Nscan2, the compensation transistor Tc is turned on in response to the third scan signal Nscan1, causing the driving transistor Tdr to be connected in diode mode. And the driving transistor Tdr is turned on, and the third reset signal resets the potentials of the third node N3, the second node N2, and the first node N1. The first reset transistor Ti1 and the second reset transistor Ti2 are both cut off in response to the first scan signal Pscan1, the data transistor Tda is cut off in response to the second scan signal Pscan2, and the first switch transistor Ts1 and the second switch transistor Ts2 are both cut off in response to the light-emitting control signal EM.

Data writing stage P2: the light-emitting control signal EM, the first scan signal Pscan1, and the third scan signal Nscan1 all correspond to the high-level state, and the second scan signal Pscan2 and the fourth scan signal Nscan2 both correspond to the low-level state. The data transistor Tda is turned on in response to the second scan signal Pscan2, and the compensation transistor Tc is turned on in response to the third scan signal Nscan1, causing the driving transistor Tdr to be connected in diode mode and turned on. The data signal Data is transmitted to the third node N3 through the data transistor Tda, the first node N1, the driving transistor Tdr, the second node N2, and the compensation transistor Tc, to achieve writing of the data signal Data and capturing of the threshold voltage of the driving transistor Tdr. The first reset transistor Ti1 and the second reset transistor Ti2 are both cut off in response to the first scan signal Pscan1, the first switch transistor Ts1 and the second switch transistor Ts2 are both cut off in response to the light-emitting control signal EM, and the third reset transistor Ti3 is cut off in response to the fourth scan signal Nscan2.

Node reset stage P3: the light-emitting control signal EM and the second scan signal Pscan2 both correspond to the high-level state, and the first scan signal Pscan1, the third scan signal Nscan1, and the fourth scan signal Nscan2 all correspond to the low-level state. The first reset transistor Ti1 and the second reset transistor Ti2 are both turned on in response to the first scan signal Pscan1, and the first reset signal VI1 resets the potential of the fourth node N4. The second reset signal VI2 has the higher voltage value, and the voltage difference between the gate and the source of the driving transistor Tdr is the voltage difference between the third node N3 and the first node N1. Therefore, as long as the voltage difference between the third node N3 and the first node N1 is less than the threshold voltage of the driving transistor Tdr, the driving transistor Tdr can be turned on, thereby causing the second reset signal VI2 to reset the potentials of the first node N1 and the second node N2. The data transistor Tda is cut off in response to the second scan signal Pscan2, the compensation transistor Tc is cut off in response to the third scan signal Nscan1, the third reset transistor Ti3 is cut off in response to the fourth scan signal Nscan2, and the first switch transistor Ts1 and the second switch transistor Ts2 are both cut off in response to the light-emitting control signal EM.

Light-emitting stage P4: the light-emitting control signal EM, the third scan signal Nscan1, and the fourth scan signal Nscan2 all correspond to the low-level state, and the first scan signal Pscan1 and the second scan signal Pscan2 both correspond to the high-level state. The first switch transistor Ts1 and the second switch transistor Ts2 are both turned on in response to the light-emitting control signal EM, and the driving transistor Tdr maintains conduction under the action of the storage capacitor Cst, and the driving current generated by the driving transistor Tdr according to the data signal Data flows between the first power terminal VDD and the second power terminal VSS, causing the light-emitting device D to emit light. The first reset transistor Ti1 and the second reset transistor Ti2 are both cut off in response to the first scan signal Pscan1, the data transistor Tda is cut off in response to the second scan signal Pscan2, the compensation transistor Tc is cut off in response to the third scan signal Nscan1, and the third reset transistor Ti3 is cut off in response to the fourth scan signal Nscan2.

Wherein, the potential changes of the first node N1, the second node N2, the third node N3, and the fourth node N4 of the sub-pixel SP in the corresponding high-frequency driving mode are as shown in Table 1. The Vth in Table 1 is the threshold voltage of the driving transistor Tdr, and Lum.vo represents the potential that actually has the certain range of fluctuation due to the change of the charging and discharging state of the circuit.

TABLE 1

| | Stage | | | |
|---|---|---|---|---|
| Node | N1 | N2 | N3 | N4 |
| P1 | VI2+\|Vth\| | VI2 | Lum.vo | VI2 |
| P2 | Data | Data−\|Vth\| | Lum.vo | Data−\|Vth\| |
| P3 | VI3 | VI3 | VI1 | Data−\|Vth\| |
| P4 | VDD | Lum.vo | Lum.vo | Data−\|Vth\| |

To achieve the display function of the ultra-low frequency driving mode while ameliorating the flicker problem caused by the ultra-low frequency driving mode, the duration corresponding to each frame (1 Frame) in one display period of the ultra-low frequency driving mode is increased, and then the display function of the ultra-low frequency driving mode is achieved in conjunction with the skip frame method.

Figure 5:
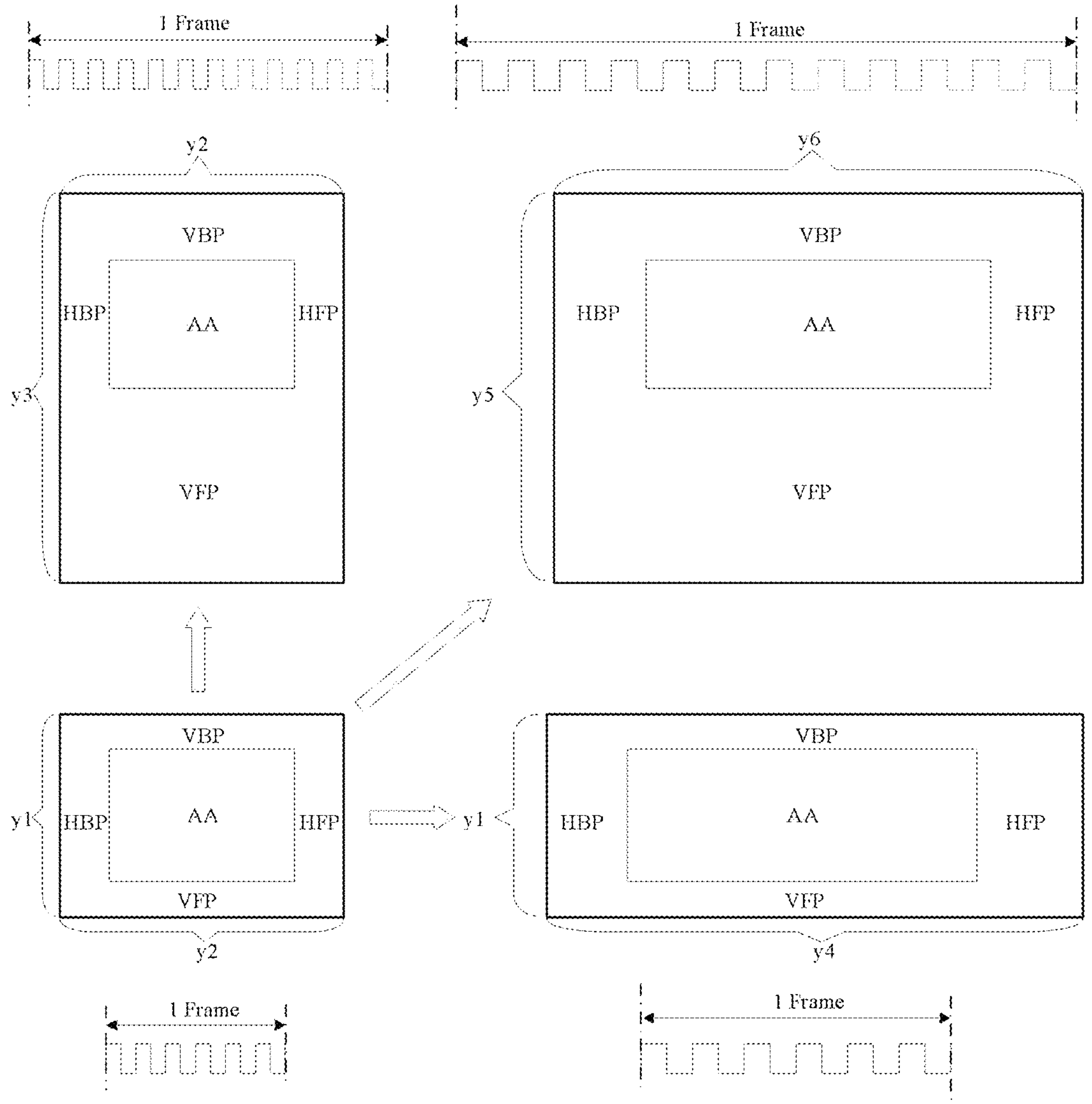
FIG. 5 is a principle diagram of increasing the duration corresponding to each frame provided in one or more embodiments of this application.

FIG. 5 is the principle diagram of increasing the duration corresponding to each frame provided in the embodiment of this application. Wherein, VBP in FIG. 5 represents the vertical back porch, VFP represents the vertical front porch, HBP represents the horizontal back porch, HFP represents the horizontal front porch, y1, y3, and y5 all represent the number of rows of pixel units Pi, and y2, y4, and y6 all represent the number of columns of pixel units Pi, y1≠y3≠y5, y2≠y4≠y6.

Due to the fact that the resolution of the display panel is fixed after fabrication, if one wishes to increase the duration corresponding to each frame, the driving control module can be made to believe that the number $N_{V\text{-}porch}$ of scan lines it needs to control is greater than the number of rows of pixel units Pi, and/or the number $N_{H\text{-}line}$ of pixel units Pi it needs to control per row is greater than the number of columns of pixel units Pi. That is, it is possible to increase the number $N_{V\text{-}porch}$ of scan lines to be controlled without changing the number $N_{H\text{-}line}$ of pixel units Pi to be controlled per row, so that the number of lines to be scanned per frame increases, thereby achieving an increase in the duration corresponding to each frame. It is also possible to increase the scan time $N_{H\text{-}line}/f_{osc}$ of each pixel unit Pi per row without changing the number $N_{V\text{-}porch}$ of scan lines to be controlled, thereby achieving an increase in the duration corresponding to each frame. It is also possible to increase the number $N_{V\text{-}porch}$ of scan lines to be controlled and the scan time $N_{H\text{-}line}/f_{osc}$ of each pixel unit Pi per row, thereby achieving an increase in the duration corresponding to each frame. Wherein, $f_{osc}$ represents the oscillation frequency of the driving control module, and $1/f_{osc}$ represents the time required for the driving control module to control the pixel unit Pi to display.

The duration $T_{frame}=N_{V\text{-}porch}*N_{H\text{-}line}/f_{osc}$ corresponding to each frame, and due to the functional limitations of the driving control module, the values of $N_{H\text{-}line}$ and $N_{V\text{-}porch}$ both have an upper limit. For example, if the register that controls the number of skip frames is 10 bits, $N_{H\text{-}line}$ can be up to 1024, and $N_{V\text{-}porch}$ can be up to VAA+1028, where VAA is the minimum value that $N_{V\text{-}porch}$ can take.

After increasing the duration corresponding to each frame, the ratio (that is, $t1*f_{osc}=N_{V\text{-}porch}*N_{H\text{-}line}$) of the first duration tfr corresponding to the writing frame WF and each holding frame HF included in one display period to the duration required for the driving controller to control one pixel unit Pi to display is greater than the number of pixel units Pi of the display device.

Since flicker will occur when each frame is displayed at the frequency lower than the critical flicker frequency CFF, the timing is optimized. Specifically, in the initialization stage P1, the data writing stage P2, and the node reset stage P3 of the writing frame WF, the working principle of the display panel achieving display with the high-frequency driving mode and the ultra-low frequency driving mode is similar. However, when achieving display with the ultra-low driving mode, the light-emitting stage P4 includes multiple light-emitting sub-stages and multiple non-light-emitting sub-stages. In each light-emitting sub-stage, the light-emitting control signal EM has the valid pulse, and the first scan signal Pscan1, the second scan signal Pscan2, the third scan signal Nscan1, and the fourth scan signal Nscan2 all have invalid pulses, so that the first switch transistor Ts1 and the second switch transistor Ts2 are both turned on in response to the light-emitting control signal EM. The driving transistor Tdr controls the illumination of the light-emitting device D by allowing the driving current generated from the data signal Data to flow between the first power supply terminal VDD and the second power supply terminal VSS. In each non-light-emitting sub-stage, the light-emitting control signal EM, the third scan signal Nscan1 and the fourth scan signal Nscan2 all have invalid pulses. The first scan signal Pscan1 has the valid pulse during the duration when the light-emitting control signal EM has the invalid pulse, and the duration of the valid pulse of the first scan signal Pscan1 is less than or equal to the duration of the invalid pulse maintained by the light-emitting control signal EM, so that the first reset transistor Ti1 and the second reset transistor Ti2 are both turned on in response to the first scan signal Pscan1, and the first reset signal VI1 resets the potential of the fourth node N4. The second reset signal VI2 has the higher voltage value, which causes the driving transistor Tdr to be turned on, thereby causing the second reset signal VI2 to reset the potentials of the first node N1 and the second node N2. By switching between display states and non-display states in the sub-pixel SP within the light-emitting stage, the display frequency is increased, thereby ameliorating the flicker problem.

Figure 6:
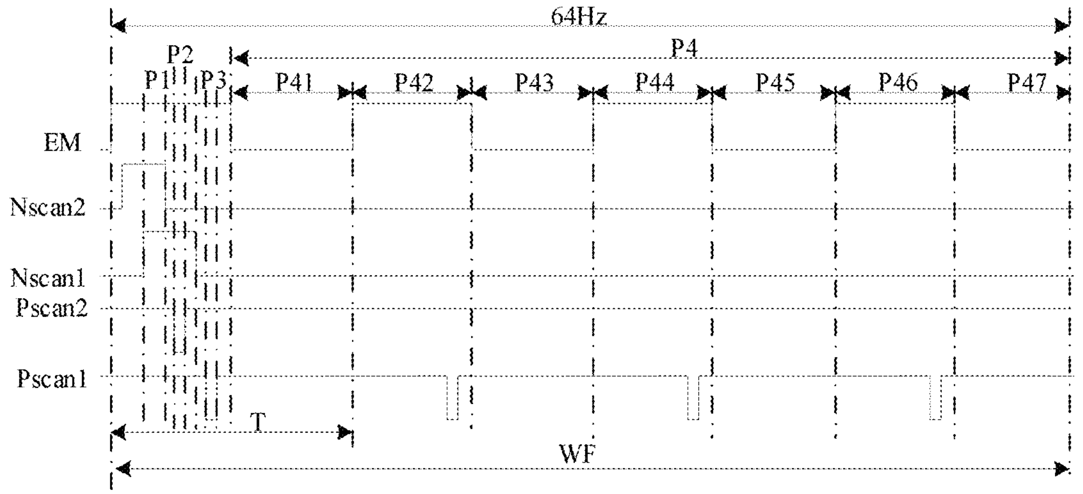
FIG. 6 is a timing diagram of the writing frame in the ultra-low-frequency driving mode provided in one or more embodiments of this application.

Specifically, the timing diagram of the writing frame WF in the ultra-low frequency driving mode is explained first. FIG. 6 is the timing diagram of the writing frame WF in the ultra-low frequency driving mode provided in the embodiment of this application. Taking a case where in the first duration tfr corresponding to the writing frame WF, the base frequency f3 of the second scan signal Pscan2 is 16 Hz, the driving transistor Tdr, the first reset transistor Ti1, the second reset transistor Ti2, the data transistor Tda, the first switch transistor Ts1, and the second switch transistor Ts2 are all P-type transistors, and the compensation transistor Tc and the third reset transistor Ti3 are N-type transistors as an example, the working principle of the sub-pixel SP in the light-emitting stage P4 of the ultra-low frequency driving mode is explained. The light-emitting stage P4 includes the first light-emitting sub-stage P41, the first non-light-emitting sub-stage P42, the second light-emitting sub-stage P43, the second non-light-emitting sub-stage P44, the third light-emitting sub-stage P45, the third non-light-emitting sub-stage P46, and the fourth light-emitting sub-stage P47.

In the first light-emitting sub-stage P41, the second light-emitting sub-stage P43, the third light-emitting sub-stage P45, and the fourth light-emitting sub-stage P47: the light-emitting control signal EM, the third scan signal Nscan1, and the fourth scan signal Nscan2 all correspond to the low-level state, and the first scan signal Pscan1 and the second scan signal Pscan2 both correspond to the high-level state. The first switch transistor Ts1 and the second switch transistor Ts2 are both turned on in response to the light-emitting control signal EM, and the driving transistor Tdr maintains conduction under the action of the storage capacitor Cst, and the driving current generated by the driving transistor Tdr according to the data signal Data flows between the first power terminal VDD and the second power terminal VSS, causing the light-emitting device D to emit light.

In the first non-light-emitting sub-stage P42, the second non-light-emitting sub-stage P44, and the third non-light-emitting sub-stage P46: the light-emitting control signal EM and the second scan signal Pscan2 both correspond to the high-level state, the third scan signal Nscan1 and the fourth scan signal Nscan2 both correspond to the low-level state, and the first scan signal Pscan1 has the low-level state for a certain duration within the duration when the light-emitting control signal EM corresponds to the high-level state. The first reset transistor Ti1 and the second reset transistor Ti2 are both turned on in response to the first scan signal Pscan1, and the first reset signal VI1 resets the potential of the fourth node N4. The second reset signal VI2 has a higher voltage value, which causes the driving transistor Tdr to be turned on, and the second reset signal VI2 resets the potentials of the first node N1 and the second node N2.

Wherein, the potential changes of the first node N1, the second node N2, the third node N3, and the fourth node N4 of the sub-pixel SP in the corresponding high-frequency driving mode are as shown in Table 2.

It can be known from Table 2 that in the multiple non-light-emitting sub-stages, the potentials of the first node N1, the second node N2, the third node N3, and the fourth node N4 remain equal. In the multiple light-emitting sub-stages, the potentials of the first node N1, the second node N2, the third node N3, and the fourth node N4 remain equal, so that the display brightness of the sub-pixel SP can be kept consistent in each light-emitting sub-stage.

TABLE 2

| | Stage | | | |
|---|---|---|---|---|
| Node | N1 | N2 | N3 | N4 |
| P1 | VI2+\|Vth\| | VI2 | Lum.vo | VI2 |
| P2 | Data | Data−\|Vth\| | Lum. vo | Data−\|Vth\| |
| P3 | VI3 | VI3 | VI1 | Data−\|Vth\| |
| P41 | VDD | Lum.vo | Lum.vo | Data−\|Vth\| |
| P42 | VI3 | VI3 | VI1 | Data−\|Vth\| |
| P43 | VDD | Lum.vo | Lum.vo | Data−\|Vth\| |
| P44 | VI3 | VI3 | VI1 | Data−\|Vth\| |
| P45 | VDD | Lum.vo | Lum.vo | Data−\|Vth\| |
| P46 | VI3 | VI3 | VI1 | Data−\|Vth\| |
| P47 | VDD | Lum.vo | Lum.vo | Data−\|Vth\| |

Figure 7:
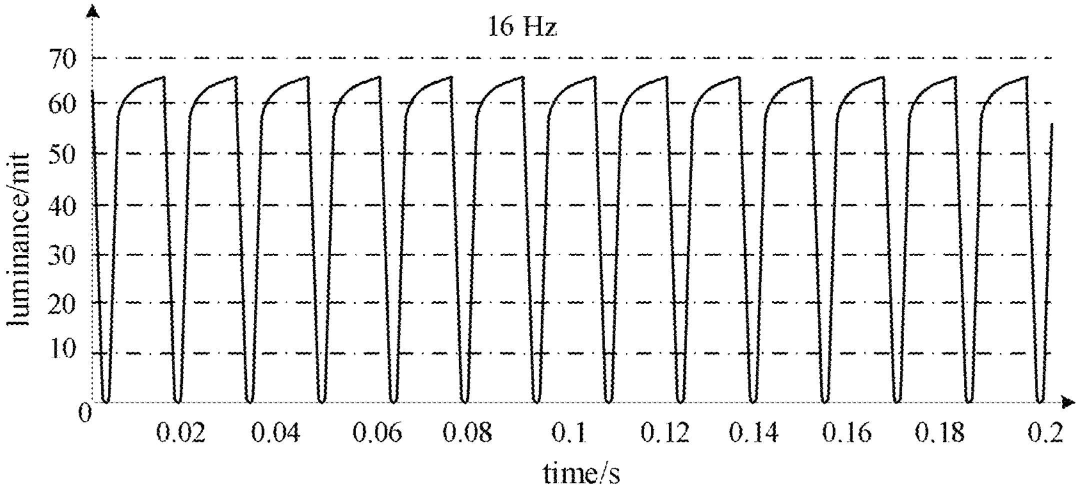
FIG. 7 is a schematic diagram of the measured light-emitting waveform at 50 nits provided in one or more embodiments of this application.

FIG. 7 is the schematic diagram of the measured light-emitting waveform at 50 nits provided in the embodiment of this application. By making the light-emitting stage include multiple light-emitting sub-stages and multiple non-light-emitting sub-stages, the display brightness of the sub-pixel SP can be kept consistent in each light-emitting sub-stage, and the flicker problem can also be ameliorated.

In the embodiment shown in FIG. 6, the base frequency f3 of the second scan signal Pscan2 is 16 Hz in the first duration tfr corresponding to the writing frame WF, and the number of periods Noft of the light-emitting control signal EM is 4, so the intermediate frequency f2 of the light-emitting control signal EM is 64 Hz. Wherein, the number of periods Ncft of the light-emitting control signal EM can be determined based on the sum of the numbers of light-emitting sub-stages and non-light-emitting sub-stages included in the writing frame WF. That is, the stage corresponding to the initialization stage P1, the data writing stage P2, and the node reset stage P3 of the writing frame WF is also a non-light-emitting sub-stage, and the sum of the numbers of the non-light-emitting sub-stage composed of the initialization stage P1, the data writing stage P2, and the node reset stage P3, and the light-emitting sub-stages included in the light-emitting stage, is equal to twice the number of periods Ncft of the light-emitting control signal EM. That is, each period T of the light-emitting control signal EM actually corresponds to a non-light-emitting sub-stage and a light-emitting sub-stage.

Optionally, the number of periods Ncft of the light-emitting control signal EM is an integer, so that the number of light-emitting sub-stages and non-light-emitting sub-stages included in each frame can be kept equal in the subsequent skip frame to achieve the ultra-low frequency display mode.

To achieve the display function of the ultra-low frequency driving mode, the light-emitting stage also correspondingly includes multiple light-emitting sub-stages and multiple non-light-emitting sub-stages in each holding frame HF. Optionally, the number of light-emitting sub-stages included in each holding frame HF is equal to the number of light-emitting sub-stages included in the writing frame WF, and the number of non-light-emitting sub-stages included in each holding frame HF is equal to the number of non-light-emitting sub-stages included in the writing frame WF, so that the writing frame WF and each holding frame HF correspondingly have the first duration tfr.

Figure 8:
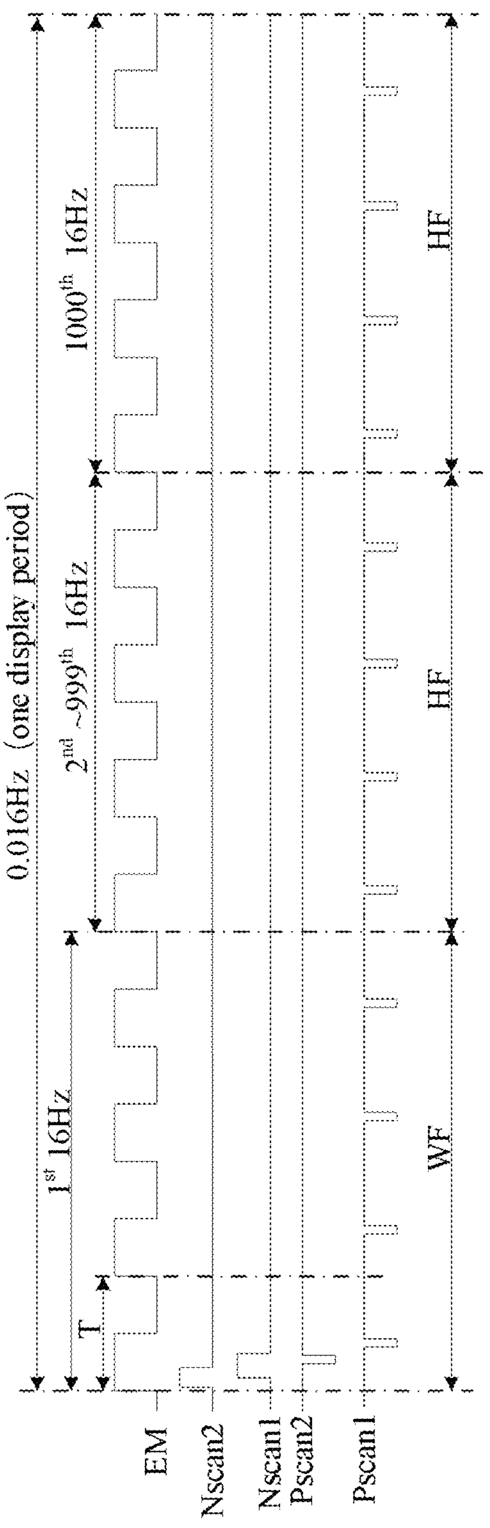
FIG. 8 is a timing diagram of one display period in the ultra-low-frequency driving mode provided in one or more embodiments of this application.

After increasing the duration corresponding to each frame, the number of skip frame corresponding to one display period in the ultra-low frequency driving mode is explained. FIG. 8 is the timing diagram of one display period in the ultra-low frequency driving mode provided in the embodiment of this application. For example, within the total duration tsu of a display period, the target frequency f1 of the second scan signal Pscan2 is 0.016 Hz; within the first duration tfr corresponding to the write-in frame WF, the base frequency f3 of the second scan signal Pscan2 is 16 Hz. Combining the sub-pixels shown in FIG. 3, an explanation is provided for the number of skip frame corresponding to one display period when using the ultra-low frequency drive mode.

In each holding frame HF, the sub-pixel SP switches between display states and non-display states under the control of the light-emitting control signal EM. The total number of frames m=16/0.016=1000 (that is, the sum of the number of writing frames WF and the multiple holding frames HF included in one display period is equal to 16/0.016=1000), that is, one display period includes one writing frame WF (that is, corresponding to the $1^{st}$ 16 Hz in FIG. 8) and 999 holding frames HF (that is, corresponding to the $2^{nd}$ to $999^{th}$ 16 Hz and the $1000^{th}$ 16 Hz in FIG. 8). And the number of skip frame SKF is equal to the number of the multiple holding frames HF included in one display period, that is, the number of skip frame SKF is equal to 999.

Optionally, the number of skip frame SKF is an integer, so that each display period includes an integer number of writing frames WF and holding frames HF. Optionally, the number of skip frame SKF is less than the skip frame limit SKL, so that the display device can achieve the desired target frequency.

By including one writing frame WF and multiple holding frames HF in one display period, the display panel displays the same display content within the total duration tsu of one display period. And since the sub-pixel SP has made multiple switches between display states and non-display states in the first duration tfr corresponding to the writing frame WF and each holding frame HF, it is possible to make the human eye unable to perceive the flicker of the display panel within the total duration tsu of one display period.

It can be understood that in addition to achieving the display at the target frequency f1 of 0.016 Hz, more corresponding ultra-low frequency displays can be obtained based on the relationships between the target frequency f1, the intermediate frequency f2, the base frequency f3, the number of periods Noft of the light-emitting control signal EM, the total number of frames m, the first duration tfr, and the total duration tsu. Only some examples corresponding to the skip frame limit SKL equal to 2/\10=1024 are shown in Table 3, and the scope of this application is not limited thereto.

It can be known from Table 3 that there can be multiple basic frequencies f3 to achieve the target frequency f1, and there can also be multiple intermediate frequencies f2 to achieve the target frequency f1. There is a maximum base frequency fmax among the multiple basic frequencies f3, and there is a minimum intermediate frequency fmin among the multiple intermediate frequencies f2. Wherein, in the first duration tfr corresponding to the writing frame WF and each holding frame HF included in one display period, the number of periods Ncft of the light-emitting control signal EM is greater than or equal to the ratio of the minimum intermediate frequency to the maximum base frequency, that is, Ncft>fmin/fmax.

TABLE 3

| Target frequency f1 | Intermediate frequency f2 | Base frequency f3 | First duration tfr | Number of periods Ncft | Total number of frame m | Total duration tsu |
|---|---|---|---|---|---|---|
| 0.008 | 64 | 4 | 0.25 | 16 | 500 | 125 |
| 0.008 | 128 | 4 | 0.25 | 32 | 500 | 125 |
| 0.008 | 64 | 8 | 0.125 | 8 | 1000 | 125 |
| 0.008 | 128 | 8 | 0.125 | 16 | 1000 | 125 |
| 0.015 | 60 | 3 | 0.3333333 | 20 | 200 | 66.666667 |
| 0.015 | 90 | 6 | 0.1666667 | 15 | 400 | 66.666667 |
| 0.015 | 120 | 12 | 0.0833333 | 10 | 800 | 66.666667 |
| 0.015 | 150 | 15 | 0.0666667 | 10 | 1000 | 66.666667 |
| 0.016 | 64 | 8 | 0.125 | 8 | 500 | 62.5 |
| 0.016 | 128 | 8 | 0.125 | 16 | 500 | 62.5 |
| 0.016 | 64 | 16 | 0.0625 | 4 | 1000 | 62.5 |
| 0.016 | 128 | 16 | 0.0625 | 8 | 1000 | 62.5 |
| 0.032 | 64 | 16 | 0.0625 | 4 | 500 | 31.25 |
| 0.032 | 128 | 16 | 0.0625 | 8 | 500 | 31.25 |
| 0.032 | 64 | 32 | 0.03125 | 2 | 1000 | 31.25 |
| 0.032 | 128 | 32 | 0.03125 | 4 | 1000 | 31.25 |
| 0.05 | 60 | 15 | 0.0666667 | 4 | 300 | 20 |
| 0.05 | 120 | 30 | 0.0333333 | 4 | 600 | 20 |
| 0.05 | 60 | 10 | 0.1 | 6 | 200 | 20 |
| 0.1 | 60 | 10 | 0.1 | 6 | 100 | 10 |
| 0.1 | 60 | 30 | 0.0333333 | 2 | 300 | 10 |
| 0.5 | 60 | 30 | 0.0333333 | 2 | 60 | 2 |

Wherein, tfr = 1/f3;
Ncft = f2/f3;
m = f3/f1 = tsu/tfr;
tsu = 1/f1 = tfr*m;
SKF = m-1;

The maximum base frequency fmax can be determined based on the skip frame limit SKL and the target frequency f1. For example, by calculating the differences between the ratios of the multiple basic frequencies f3 to the target frequency f1 and the skip frame limit SKL, multiple first differences can be obtained. The base frequency f3 corresponding to the smallest difference among the multiple first differences is the maximum base frequency fmax. Wherein, the ratios of the multiple basic frequencies f3 and the target frequency f1 are all less than the skip frame limit SKL.

The minimum intermediate frequency fmin can be determined based on a product of the critical flicker frequency CFF and the number of periods Ncft. For example, by calculating the differences between the multiple intermediate frequencies f2 and the critical flicker frequency CFF, multiple second differences can be obtained. The intermediate frequency f2 corresponding to the smallest difference among the multiple second differences is the minimum intermediate frequency fmin. Wherein, the multiple intermediate frequencies f2 are all greater than the critical flicker frequency CFF.

That is, if the skip frame limit SKL is equal to 2/\10=1024 and the target frequency f1 is 0.016 Hz, then the minimum intermediate frequency fmin is 64 Hz, the maximum base frequency fmax is 16 Hz, so in the first duration tfr corresponding to the writing frame WF and each holding frame HF included in one display period, the number of periods Ncft of the light-emitting control signal EM is greater than or equal to 4.

It can be understood that in the ultra-low frequency driving display mode, depending on the different target frequencies f1 to be achieved, the timing of the writing frame WF and the timing of one display period will also be different from those corresponding to FIG. 6 and FIG. 8. Those skilled in the art can obtain the timing of the writing frame WF and the timing of one display period corresponding to the target frequency f1 to be achieved based on this application, and for the sake of saving words, other embodiments are not described in detail in this application.

Table 4 is the flicker test result table obtained when the base frequency f3 is 16 Hz, the intermediate frequency f2 is 64 Hz, and the target frequency f1 is 0.016 Hz.

TABLE 4

| Mode | AOD(Always On Display) | | | | | | | | | SPEC. |
|---|---|---|---|---|---|---|---|---|---|---|
| Frame rate | 60 | 30 | 15 | 10 | 5 | 1 | 0.1 | 0.06 | 0.016 | — |
| flicker/dB | −62.9 | −62.9 | −62.9 | −63 | −63 | −63 | −63.5 | −64.2 | −45.9 | <−30 |

By Table 4, it can be known that when the display panel displays with the target frequency f1 of 0.016 Hz in the ultra-low frequency driving mode, the flicker degree of the display panel is still less than the specification value. Therefore, the display panel can achieve ultra-low frequency display while ensuring that the human eye cannot perceive the flickers, resulting in better display performance.

Figure 9:
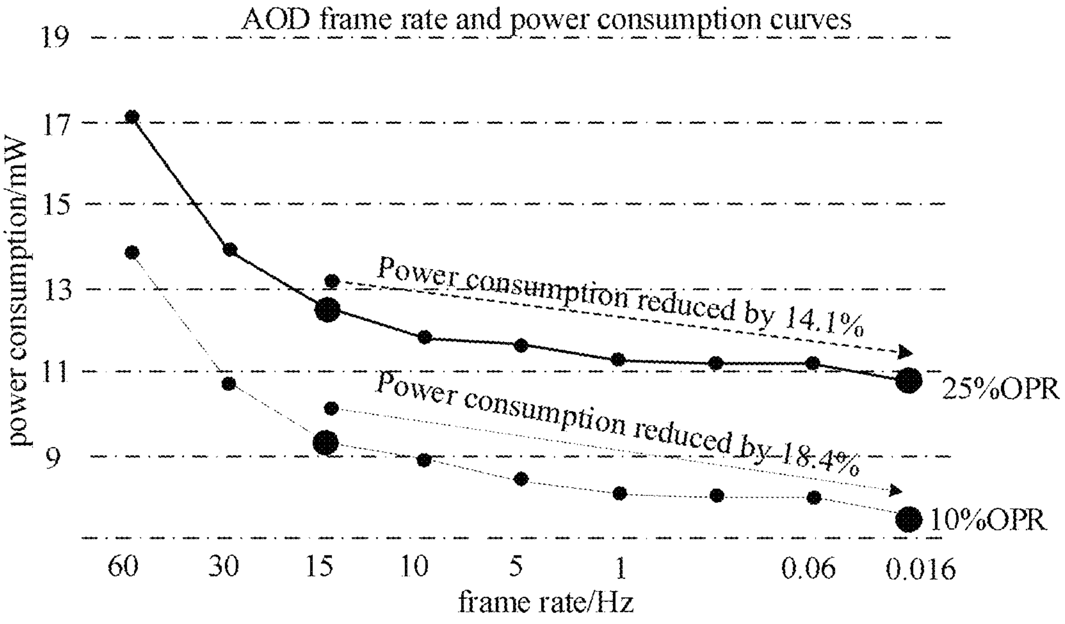
FIG. 9 is a schematic diagram of power consumption test results provided in one or more embodiments of this application.

FIG. 9 is the schematic diagram of power consumption test results provided in the embodiment of this application. Wherein, 25% OPR refers to 25% of the display area of the screen emitting light, and 10% OPR refers to 10% of the display area of the screen emitting light. As can be seen from FIG. 9, compared to the existing display implementation using a low-frequency drive mode, the display implementation using an ultra-low frequency drive mode according to this application results in a power consumption reduction of 14.1% at 25% OPR and a reduction of 18.4% at 10% OPR. Therefore, the purpose of reducing power consumption can be achieved, which can give the display device better endurance.

It can be understood that the display device includes portable display devices (such as notebook computers, mobile phones, etc.), fixed terminals (such as desktop computers, televisions, etc.), and measuring devices (such as sports bracelets, thermometers, etc.).

For those skilled in the art, based on the idea of this application, there will be changes in specific implementation methods and application ranges. The content of this description should not be understood as limiting the scope of this application.

What is claimed is:

1. A display device, comprising:

a display panel, comprising multiple sub-pixels;

a gate driver, comprising a first gate driving unit and a second gate driving unit, the first gate driving unit being configured to output a first scan signal to the sub-pixels, the second gate driving unit being configured to output a second scan signal to the sub-pixels; and an emission driver, configured to output a light-emitting control signal to the sub-pixels;

wherein the display panel has multiple display periods, at least one of the display periods comprises a writing frame and multiple holding frames, the writing frame and each of the multiple holding frames both have a first duration; within the writing frame and each of the multiple holding frames, the light-emitting control signal has multiple periods, a ratio of number of the periods of the light-emitting control signal to the first duration is greater than a critical flicker frequency; and the light-emitting control signal has a valid pulse and an invalid pulse in each period, the first scan signal has a valid pulse during a duration of the invalid pulse of the light-emitting control signal in the writing frame and the multiple holding frames, the second scan signal has a valid pulse during a duration of the invalid pulse in a first one of the periods of the light-emitting control signal in the writing frame; wherein, total number of frames comprised in one display period is less than or equal to a skip frame limit; wherein the total number of frames is a sum of numbers of the writing frame and the multiple holding frames within one of the display periods, the skip frame limit is 2/\x, where x is number of bits corresponding to a register controlling number of skipped frames.

2. The display device according to claim 1, wherein within a total duration corresponding to the writing frame and the multiple holding frames, a target frequency of the second scan signal is less than 1 Hz.

3. The display device according to claim 2, wherein within the writing frame, a product of a base frequency of the second scan signal and the number of the periods of the light-emitting control signal is equal to an intermediate frequency of the light-emitting control signal.

4. The display device according to claim 3, wherein a ratio of the base frequency to the target frequency is equal to a sum of numbers of the writing frame and the multiple holding frames.

5. The display device according to claim 3, wherein the base frequency is 16 Hz, the intermediate frequency is 64 Hz and the target frequency is 0.016 Hz.

6. The display device according to claim 1, wherein each sub-pixel comprises:

a light-emitting device;

a driving transistor, configured to generate a driving current based on a data signal to drive the light-emitting device to emit light;

a first reset transistor, configured to reset a potential of an anode of the light-emitting device based on the first scan signal, a second reset transistor, configured to reset potentials of an input electrode and an output electrode of the driving transistor based on the first scan signal;

a data transistor, configured to transmit the data signal to the driving transistor through a first node based on the second scan signal;

a light-emitting control transistor, configured to control on and off of a conduction path of the driving current based on the light-emitting control signal.

7. The display device according to claim 6, wherein, the driving transistor comprises the input electrode connected to the first node, the output electrode connected to a second node, and a control electrode connected to a third node;

the data transistor comprises a control electrode configured to receive the second scan signal, an input electrode configured to receive the data signal, and an output electrode connected to the first node;

the light-emitting control transistor comprises a first switch transistor and a second switch transistor; the first switch transistor comprises a control electrode configured to receive the light-emitting control signal, an input electrode connected to a first power supply terminal, and an output electrode connected to the first node; the second switch transistor comprises a control electrode configured to receive the light-emitting control signal, an input electrode connected to the second node, and an output electrode connected to a fourth node;

the first reset transistor comprises a control electrode configured to receive the first scan signal, an input electrode configured to receive a first reset signal, and an output electrode connected to the fourth node;

the second reset transistor comprises a control electrode configured to receive the first scan signal, an input electrode configured to receive a second reset signal, and an output electrode connected to the first node; and the light-emitting device comprises an anode connected to the fourth node and a cathode connected to a second power supply terminal;

wherein during durations of all the invalid pulses of the light-emitting control signal, a potential of the first node remains equal, a potential of the second node remains equal, a potential of the third node remains equal, and a potential of the fourth node remains equal.

8. The display device according to claim 7, wherein the driving transistor is a P-type transistor, and during the duration of each valid pulse of the first scan signal, a potential difference between the third node and the second reset signal is less than a threshold voltage of the driving transistor.

9. The display device according to claim 7, wherein, the gate driver further comprises a third gate driving unit, the third gate driving unit being configured to output a third scan signal and a fourth scan signal to the sub-pixels;

each sub-pixel further comprises a compensation transistor, a third reset transistor, and a storage capacitor;

the compensation transistor comprises a control electrode configured to receive the third scan signal, an input electrode connected to the third node, and an output electrode connected to the second node;

the third reset transistor comprises a control electrode configured to receive the fourth scan signal, an input electrode configured to receive a third reset signal, and an output electrode connected to the third node;

the storage capacitor comprises a first electrode connected to the first power supply terminal and a second electrode connected to the third node;

wherein both the third scan signal and the fourth scan signal have a valid pulse during the duration of the invalid pulse in the first period of the light-emitting control signal in the writing frame.

10. The display device according to claim 1, wherein the multiple sub-pixels form multiple pixel units arranged in an array, each pixel unit comprises three of the sub-pixels; the display device further comprises a driving controller configured to generate a control signal to control the gate driver and the emission driver to achieve control of a display state of the multiple pixel units;

wherein a ratio of the first duration to a duration required for the driving controller to control one of the pixel units to display is greater than number of pixel units of the display device.

11. The display device according to claim 10, wherein the ratio is equal to a product of $N_{H\text{-}line}$ and $N_{V\text{-}porch}$;

wherein $N_{H\text{-}line}$ is greater than number of columns of the pixel units, and $N_{V\text{-}porch}$ is greater than number of rows of the pixel units.

* * * * *